US011860842B2

United States Patent
Voleti et al.

(10) Patent No.: US 11,860,842 B2
(45) Date of Patent: *Jan. 2, 2024

(54) SEARCH ENGINE OPTIMIZATION BY SELECTIVE INDEXING

(71) Applicant: eBay Inc., San Jose, CA (US)

(72) Inventors: Suman Voleti, San Jose, CA (US); Ganesh Talele, Milpitas, CA (US); Atiq Islam, San Jose, CA (US); Ritu Goel, Foster City, CA (US)

(73) Assignee: EBAY INC., San Jose, CA (US)

( * ) Notice: Subject to any disclaimer, the term of this patent is extended or adjusted under 35 U.S.C. 154(b) by 449 days.

This patent is subject to a terminal disclaimer.

(21) Appl. No.: 16/950,636

(22) Filed: Nov. 17, 2020

(65) Prior Publication Data

US 2021/0073192 A1 Mar. 11, 2021

Related U.S. Application Data

(63) Continuation of application No. 15/131,139, filed on Apr. 18, 2016, now Pat. No. 10,846,276.

(Continued)

(51) Int. Cl.
*G06F 16/00* (2019.01)
*G06F 16/22* (2019.01)
(Continued)

(52) U.S. Cl.
CPC ........ *G06F 16/2228* (2019.01); *G06F 16/951* (2019.01); *G06F 16/958* (2019.01);
(Continued)

(58) Field of Classification Search
CPC .. G06F 16/2228; G06F 16/951; G06F 16/958; G06N 20/00; G06N 20/20; G06Q 30/0623
See application file for complete search history.

(56) References Cited

U.S. PATENT DOCUMENTS 8,396,742 B1 * 3/2013 Blume ............... G06Q 30/0246
705/14.1
8,700,583 B1 * 4/2014 Lesiewicz ........... G06F 16/2228
707/696

(Continued)

FOREIGN PATENT DOCUMENTS

CN 103778548 A 5/2014
CN 103942704 7/2014
(Continued)

OTHER PUBLICATIONS

Office Action received for Chinese Patent Application No. 201680038393.2 dated Jan. 20, 2021, 7 pages (Official Copy Only).
(Continued)

*Primary Examiner* — Noosha Arjomandi
(74) *Attorney, Agent, or Firm* — SCHWEGMAN LUNDBERG & WOESSNER, P.A.

(57) ABSTRACT

Example embodiments involve a system and methods for identifying valuable view item pages for search engine optimization. According to certain embodiments, the system performs operations that include predicting the probability of future traffic for a given product based on a number of product level factors as input variables, and identifying a selection of view item pages corresponding to the products with the probability of the highest future traffic in order to maximize the driving natural search traffic to a linked site of the corresponding view item page.

20 Claims, 5 Drawing Sheets

Related U.S. Application Data

(60) Provisional application No. 62/187,016, filed on Jun. 30, 2015.

(51) Int. Cl.
  *G06Q 30/0601* (2023.01)
  *G06N 20/00* (2019.01)
  *G06F 16/951* (2019.01)
  *G06F 16/958* (2019.01)
  *G06N 20/20* (2019.01)

(52) U.S. Cl.
  CPC ............. *G06N 20/00* (2019.01); *G06N 20/20* (2019.01); *G06Q 30/0623* (2013.01)

(56) References Cited

U.S. PATENT DOCUMENTS

| | | | |
|---|---|---|---|
| 9,798,753 | B1* | 10/2017 | Cook .................. G06F 16/2228 |
| 9,805,102 | B1 | 10/2017 | Collins et al. |
| 10,204,121 | B1* | 2/2019 | Thirumalai ......... G06F 16/2228 |
| 10,242,395 | B1 | 3/2019 | Manjunathaiah |
| 10,846,276 | B2* | 11/2020 | Voleti ..................... G06N 20/20 |
| 2002/0083048 | A1 | 6/2002 | Tenorio et al. |
| 2004/0103017 | A1 | 5/2004 | Reed et al. |
| 2005/0091580 | A1* | 4/2005 | Kamholz .............. G06F 16/958 707/E17.116 |
| 2007/0168465 | A1 | 7/2007 | Toppenberg et al. |
| 2008/0168053 | A1 | 7/2008 | Garg et al. |
| 2010/0198772 | A1* | 8/2010 | Silverman .............. G06Q 30/02 706/54 |
| 2011/0264609 | A1 | 10/2011 | Liu et al. |
| 2012/0016772 | A1 | 1/2012 | Sadagopan et al. |
| 2013/0013610 | A1* | 1/2013 | Simon ................ G06Q 10/0833 707/E17.046 |
| 2014/0324537 | A1 | 10/2014 | Gilbert |
| 2016/0162596 | A1 | 6/2016 | Reyes et al. |
| 2017/0004159 | A1* | 1/2017 | Voleti .................. G06F 16/2228 |
| 2017/0148051 | A1 | 5/2017 | Bagheri et al. |
| 2021/0073192 | A1* | 3/2021 | Voleti .................... G06F 16/958 |
| 2022/0108262 | A1* | 4/2022 | Cella .............. G06Q 10/063118 |

FOREIGN PATENT DOCUMENTS

| | | |
|---|---|---|
| CN | 103942704 A | 7/2014 |
| CN | 107710186 | 2/2018 |
| CN | 107710186 A | 2/2018 |
| WO | 2017/003564 A1 | 1/2017 |
| WO | 2017003564 | 1/2017 |

OTHER PUBLICATIONS

Notice of Allowance received for Korean Patent Application No. 10-2018-7002930, dated Nov. 30, 2020, 3 pages (2 pages of official copy & 1 page of English translation).
Office Action received for Korean Patent Application No. 10-2018-7002930, dated Dec. 30, 2019, 10 pages (5 pages of official copy and 5 pages of English translation).
Office Action received for Korean Patent Application No. 10-2018-7002930, dated Jul. 31, 2020, 10 pages (5 pages of official copy and 5 pages of English translation).
Office Action received for Korean Patent Application No. 10-2018-7002930, dated Apr. 19, 2019, 9 pages (4 pages of English translation and 5 pages of official copy).
Advisory Action received for U.S. Appl. No. 15/131,139, dated Jun. 8, 2020, 3 pages.
Final Office Action received for U.S. Appl. No. 15/131,139, dated Mar. 30, 2020, 20 pages.
Final Office Action received for U.S. Appl. No. 15/131,139, dated Aug. 28, 2019, 18 pages.
First Action Interview—Pre-Interview Communication received for U.S. Appl. No. 15/131,139, dated Apr. 25, 2019, 7 pages.
First Action Interview—Office Action Summary received for U.S. Appl. No. 15/131,139, dated Jun. 7, 2019, 9 pages.
Non Final Office Action received for U.S. Appl. No. 15/131,139, dated Dec. 16, 2019, 18 pages.
Notice of Allowance received for U.S. Appl. No. 15/131,139, dated Jul. 22, 2020, 16 pages.
Supplemental Notice of Allowability received for U.S. Appl. No. 15/131,139, dated Oct. 28, 2020, 6 pages.
Communication Pursuant to Article 94(3) EPC received for European Patent Application No. 16818388.7, dated Dec. 20, 2019, 6 pages.
Extended European Search Report received for European Patent Application No. 16818388.7, dated Feb. 22, 2018, 8 pages.
Summons to Attend Oral Proceedings received for European Patent Application No. 16818388.7, mailed on Apr. 29, 2020, 8 pages.
Office Action received for Chinese Patent Application No. 201680038393.2, dated Jul. 27, 2020, 16 pages (7 pages of official copy and 9 pages of English translation).
International Preliminary Report on Patentability received for PCT Patent Application No. PCT/US2016/032065, dated Jan. 11, 2018, 6 pages.
International Search Report received for PCT Patent Application No. PCT/US2016/032065, dated Aug. 18, 2016, 2 pages.
International Written Opinion received for PCT Patent Application No. PCT/US2016/032065, dated Aug. 18, 2016, 4 pages.
Si, "What Meta Robots Tag are for", Retrieved from the Internet URL: <http://web.archive.org/web/20100516061812/http:/lseo-hacker.com:SO/what-meta-robots-tag-are-for/>, May 16, 2010, 4 pages.
Office Action received for Chinese Patent Application No. 201680038393.2 dated Jul. 27, 2021, 8 Pages (6 Official Copy & 2 pages of English Translation).
Decision of Rejection received fer Chinese Patent Application No. 201680038393.2, dated Nov. 3, 2021, 7 pages (2 pages of Engiish translation and 5 pages of official copy only).
"International Application Serial No. PCT US2016 032065, International Search Report dated Aug. 18, 2016", 2 pgs.
"International Application Serial No. PCT US2016 032065, Written Opinion dated Aug. 18, 2016", 4 pgs.
"International Application Serial No. PCT US2016 032065, International Preliminary Report on Patentability dated Jan. 11, 2018", 6 pgs.
"European Application Serial No. 16818388.7, Extended European Search Report dated Feb. 22, 2018", 8 pgs.
"U.S. Appl. No. 15/131,139, First Action Interview—Pre-Interview Communication dated Apr. 25, 2019", 7 pgs.
"Korean Application Serial No. 2018-7002930, Notice of Preliminary Rejection dated Apr. 19, 2019", w English translation, 10 pgs.
"U.S. Appl. No. 15/131,139, First Action Interview—Office Action Summary dated Jun. 7, 2019", 9 pgs.
"U.S. Appl. No. 15/131,139, Final Office Action dated Aug. 28, 2019", 18 pgs.
"U.S. Appl. No. 15/131,139, Non Final Office Action dated Dec. 16, 2019", 18 pgs.
"European Application Serial No. 16818388.7, Communication Pursuant to Article 94(3) EPC dated Dec. 20, 2019", 6 pgs.
"Korean Application Serial No. 2018-7002930, Notice of Preliminary Rejection dated Dec. 30, 2019", W English Translation, 10 pgs.
"Chinese Application Serial No. 201680038393.2, Notice of Reexamination dated May 9, 2023", W English Translation, 4 pgs.
"U.S. Appl. No. 15/131,139, Final Office Action dated Mar. 30, 2020", 20 pgs.
"U.S. Appl. No. 15/131,139, Advisory Action dated Jun. 8, 2020", 3 pgs.
"U.S. Appl. No. 15/131,139, Notice of Allowance dated Jul. 22, 2020", 16 pgs.
"U.S. Appl. No. 15/131,139, Notice of Allowance dated Oct. 28, 2020", 6 pgs.
"Korean Application Serial No. 2018-7002930, Office Action dated Jul. 31, 2020", w English Translation, 9 pgs.
"Chinese Application Serial No. 201680038393.2, Office Action dated Jul. 27, 2020", w English Translation, 13 pgs.

(56) References Cited

OTHER PUBLICATIONS

U.S. Appl. No. 15/131,139 U.S. Pat. No. 10,846,276, filed Apr. 18, 2016, Search Engine Optimization by Selective Indexing.

* cited by examiner

SEARCH ENGINE OPTIMIZATION BY SELECTIVE INDEXING

CLAIM OF PRIORITY

This application is a continuation of U.S. patent application Ser. No. 15/131,139, entitled "Search Engine Optimization by Selective Indexing" by Voleti et al., and filed Apr. 18, 2016; which claims the benefit of priority of U.S. Provisional Patent Application No. 62/187,016, entitled "Locating Valuable View Image Pages" by Voleti et al., and filed Jun. 30, 2015; each of which is hereby incorporated by reference in its entirety.

TECHNICAL FIELD

This application relates to systems and methods for search engine optimization.

BACKGROUND

Search engine indexing collects, parses, and stores data to facilitate fast and accurate information retrieval. The purpose of storing an index is to optimize speed and performance in finding relevant documents for a search query. Without an index, a search engine would scan every document in a corpus, which would require considerable time and computing power. For example, while an index of 10,000 documents can be queried within milliseconds, a sequential scan of every word in 10,000 large documents could take hours. The additional computer storage required to store the index, as well as the considerable increase in the time required for an update to take place, are traded off for the time saved during information retrieval.

BRIEF DESCRIPTION OF THE DRAWINGS

Some embodiments are illustrated by way of example and not limitation in the figures of the accompanying drawings in which.

DETAILED DESCRIPTION

Figure 1:
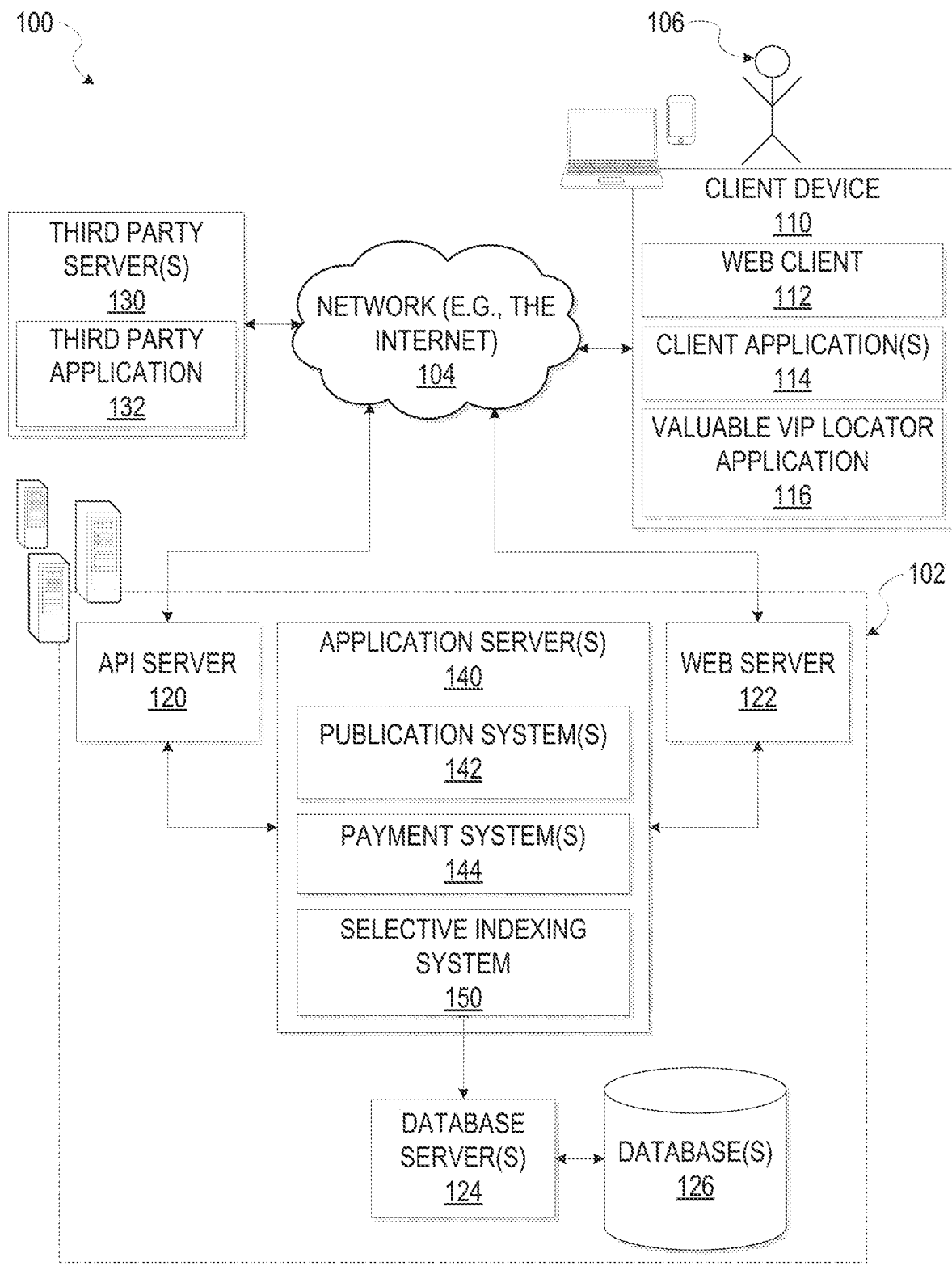
FIG. 1 is a network diagram depicting a client-server system, within which one example embodiment may be deployed.

Reference will now be made in detail to specific example embodiments for carrying out the inventive subject matter. Embodiments may be practiced without some or all of these details. It will be understood that the forgoing disclosure is not intended to limit the scope of the claims to the described embodiments. On the contrary, it is intended to cover alternatives, modifications, and equivalents as may be included within the scope of the disclosure as defined by the appended claims. In addition, well known features may not have been described in detail to avoid unnecessarily obscuring the subject matter.

Example embodiments involve a system and methods for identifying valuable view item pages (VIPs) to improve (e.g., increase) traffic from a search engine (e.g., GOOGLE™, BING™) to a site linked to the VIP (e.g., a linked site, EBAY™). The system and methods provide an improvement over existing systems, which do nothing to identify or select valuable VIPs for use in driving traffic from display sites. The system and methods described herein improve the earlier system by predicting the probability of future traffic for a given product based on a number of product level factors as input variables, and identifying a selection of VIPs corresponding to the products with the probability of the highest future traffic in order to maximize driving natural search traffic to a linked site of the corresponding VIP (e.g., EBAY).

The probability of future traffic for a given item is determined by building a machine learned (ML) model. An ML model makes data-driven predictions and decisions based on a set of inputs. In some example embodiments, the ML model is generated through gradient boosted machine learning techniques (GBM). GBM is a machine learning technique for regression and classification, which produces a prediction model in the form of an ensemble of weak prediction models (e.g., a decision tree). The ML model is trained and tested by providing sample data as input data and a target variable (e.g., a natural search traffic value). The ML model may then make correlations between the sample data and the target variable output.

The ML model calculates a probability of future traffic for a given product (or set of products) based on input variables that include item level factors and previous search engine optimization (SEO) performance metrics for a VIP that corresponds to a product or set of products. Previous SEO performance metrics include, for example, natural search traffic, view count, listing type (e.g., good till canceled, auction format, Dutch auction, buy it now, etc.), rank weighted impressions count, meta category, watch count, predicted quality, median price of similar products, price, number of listings by the seller of the product, time on site, seller feedback score, bounce count (e.g., number of sessions in which a user left a site from the entrance page without interacting with the page), previous bounce count, quantity of the product, condition, and quantity sold. In some embodiments, the natural search traffic through the VIPs are used as a target variable by the ML model to calculate the probability of future traffic based on a GBM technique. The natural search traffic is a frequency in which the product is returned as a natural search result, as opposed to being presented as an advertisement. Based on the natural search traffic calculated by the ML model, the system is configured to make an index or no-index decision for a product (or set of products).

Having calculated the probability of future traffic for a set of VIPs, and made index and no-index decisions for a product (or set of products), the ML model identifies one of more VIPs from among the set of VIPs to maximize traffic to a linked site (e.g., of the VIP), based on the index and no-index decisions. For example, the system may access a VIP of a product which has been categorized as "index," and insert an HTML meta tag within the VIP indicating that the VIP is an index page. Meta tags are used by search engines to determine whether a page is to be returned as a search result or not. A web page (e.g., a product listing page, a VIP) which includes an "index" meta tag would therefore be retrieved and included among a set of search results, while a page that includes a "no-index" tag would not be shown in a set of search results. Thus, by including the appropriate tag (index or no-index), whether or not a page (e.g., a VIP) may be returned among a set of search results may be specified.

FIG. 1 is an example embodiment of a high-level client-server-based network architecture 100. A networked system 102, in the example forms of a network-based publication or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), client application(s) 114, and a VIP locator application 116 executing on the client device 110.

The client device 110 may comprise, but is not limited to, a wearable device, mobile phone, desktop computer, laptop, portable digital assistant (PDA), smart phone, tablet, ultra-book, netbook, laptop, multi-processor system, microprocessor-based or programmable consumer electronics, game console, set-top box, or any other communication device that a user may utilize to access the networked system 102. In some embodiments, the client device 110 comprises a display module (not shown) to display information (e.g., in the form of user interfaces). In further embodiments, the client device 110 comprises one or more of touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based publication system that responds to requests for product listings, publishes publications comprising item listings of products available on the network-based publication system, and manages payments for these transactions. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may include one or more client applications 114 (also referred to as "apps") such as, but not limited to, a web browser, messaging application, electronic mail (email) application, an e-commerce site application (also referred to as a marketplace application), and the like. In some embodiments, if the e-commerce site application is included in the client device 110, then the client application (s) 114 is configured to locally provide the user interface and at least some of the functionalities with the client application (s) 114 configured to communicate with the networked system 102, on an as needed basis, for data or processing capabilities not locally available (e.g., access to a database of items available for sale, to authenticate a user, to verify a method of payment). Conversely, if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application server(s) 140 may host one or more publication system 142 and payment system 144, each of which may comprise one or more modules or applications and each of which may be embodied as hardware, software, firmware, or any combination thereof. The application server(s) 140 are, in turn, shown to be coupled to one or more database server 124 that facilitates access to one or more information storage repositories or database(s) 126. In an example embodiment, the database(s) 126 are storage devices that store information to be posted (e.g., publications or listings) to the publication system(s) 142. The databases(s) 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, publication, marketplace, or payment functions that are supported by the relevant applications of the networked system 102.

The publication system(s) 142 provides a number of publication functions and services to the users 106 that access the networked system 102. The payment system(s) 144 likewise provides a number of functions to perform or facilitate payments and transactions. While the publication system(s) 142 and payment system(s) 144 are shown in FIG. 1 to both form part of the networked system 102, it will be appreciated that, in alternative embodiments, each system 142 and 144 may form part of a payment service that is separate and distinct from the networked system 102. In some embodiments, the payment system(s) 144 may form part of the publication system(s) 142.

A selective indexing system 150 provides functionality operable to calculate a probability of future traffic for a given product, and based on the probability, select a set of view item pages corresponding to the products with the probability of the highest traffic. For example, the selective indexing system 150 accesses a set of items, generates an ML model, and based on the ML model, predicts the probability of future traffic for items from among a set of items. In some example embodiments, the selective indexing system 150 is a part of the publication system(s) 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system(s) 142, payment system(s) 144, and selective indexing system 150 could also be implemented as standalone software programs, which do not necessarily have networking capabilities.

The web client 112 may access the various publication and payment systems 142 and 144 via the web interface supported by the web server 122. Similarly, the VIP locator application 116 accesses the various services and functions provided by the publication and payment systems 142 and 144 via the programmatic interface provided by the API server 120. The VIP locator application 116 may, for example, generate an ML model to enable users to predict the probability of future traffic for a particular item from among a set of items, and select view item pages corresponding to the items with the greatest probability of future traffic for display at a display site through the networked system 102 in an off-line manner, and to perform batch-mode communications between the VIP locator application 116 and the networked system 102.

Figure 2:
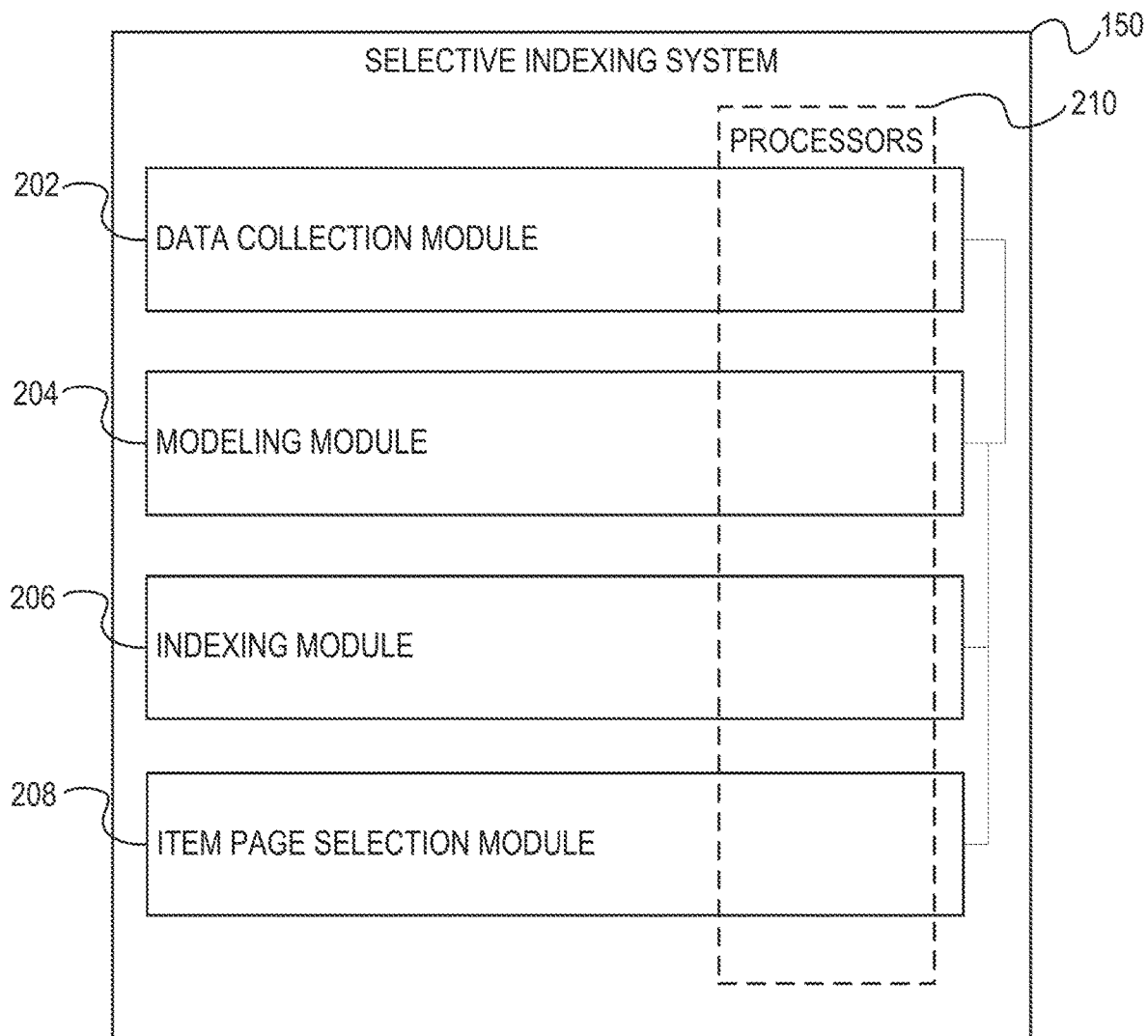
FIG. 2 is a block diagram illustrating components of a selective indexing system suitable for selecting valuable view item pages for selective indexing, according to some example embodiments.

FIG. 2 is a block diagram illustrating components of the selective indexing system 150 that configure the selective indexing system 150 to identify valuable view item pages for selective indexing, according to some example embodiments. The selective indexing system 150 is shown as including a data collection module 202, a modeling module 204, an indexing module 206, and an item page selection module 208, all configured to communicate with each other (e.g., via a bus, shared memory, or a switch). Any one or more of these modules 202-208 may be implemented using one or more processors 210 (e.g., by configuring such one or more processors 210 to perform functions described for that module) and hence may include one or more of the processors 210.

Any one or more of the modules 202-208 described may be implemented using hardware alone (e.g., one or more of the processors 210 of a machine) or a combination of hardware and software. For example, any module described of the selective indexing system 150 may physically include an arrangement of one or more of the processors 210 (e.g., a subset of or among the one or more processors of the machine) configured to perform the operations described herein for that module. As another example, any module of the selective indexing system 150 may include software, hardware, or both, that configure an arrangement of one or more processors 210 (e.g., among the one or more processors of the machine) to perform the operations described herein for that module. Accordingly, different modules of the selective indexing system 150 may include and configure different arrangements of such processors 210 or a single arrangement of such processors 210 at different points in time. Moreover, any two or more modules of the selective indexing system 150 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
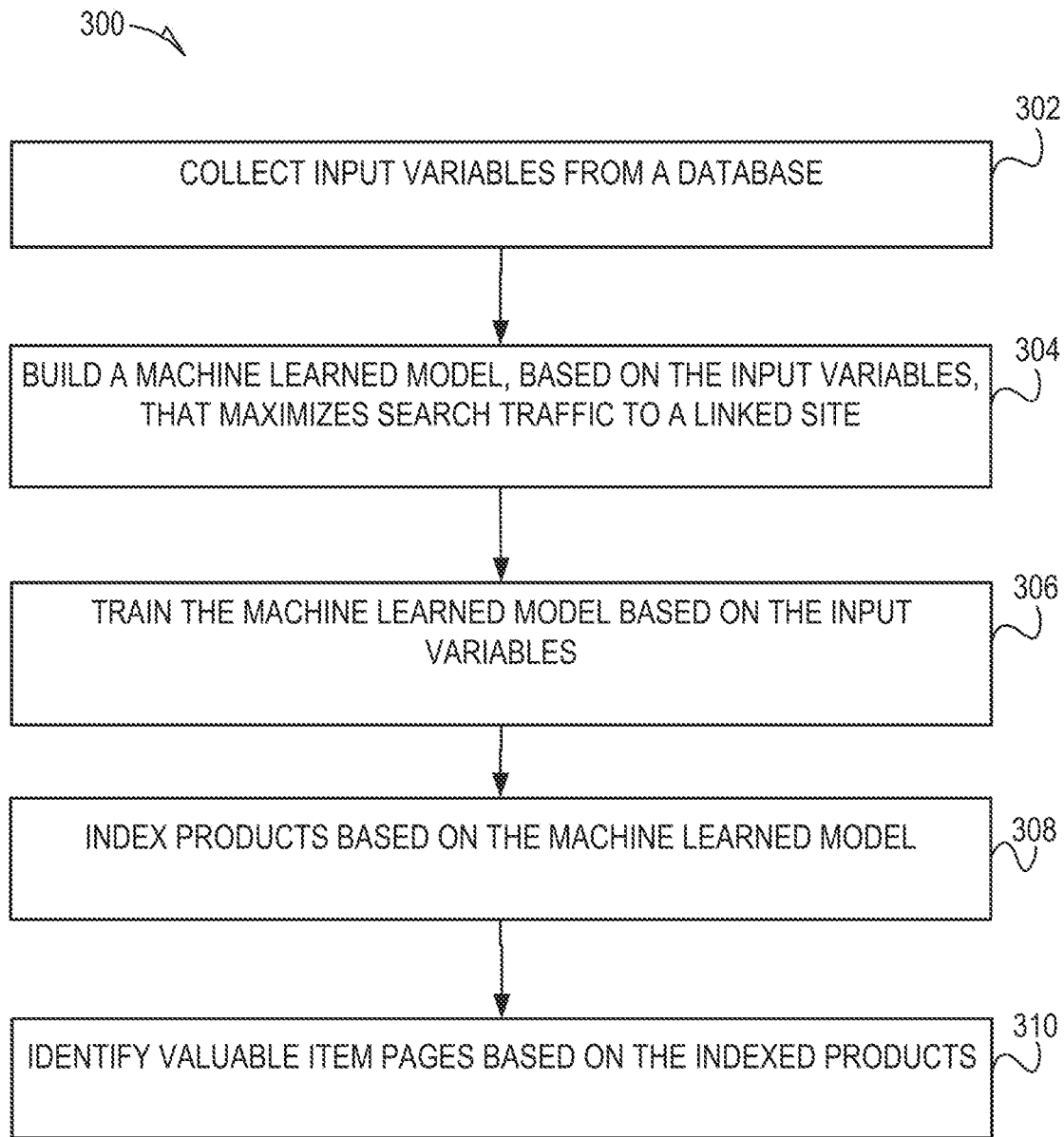
FIG. 3 is a flowchart illustrating operations of the selective indexing system in identifying valuable view item pages based on indexed items, according to some example embodiments.

FIG. 3 is a flowchart illustrating operations of the selective indexing system 150 in performing a method 300 of identifying valuable view item pages based on indexed items, according to some example embodiments. As shown in FIG. 3, one or more operations 302, 304, 306, 308, and 310 may be performed as part (e.g., a precursor task, a subroutine, or a portion) of the method 300, according to some example embodiments.

In operation 302, the data collection module 202 of the selective indexing system 150 accesses a database (e.g., database(s) 126) to collect input variables associated with a product (or set of products). The input variables include item level factors. For example, the item level factors that are gathered include natural search traffic of the product (i.e., frequency with which the product is returned as a natural search result, as opposed to being presented as an advertisement), a view count of the product (i.e., how many "clicks" a listing of the product gets), price, number of listings of the product (i.e., within a network based publication system), bounce count, number of unique sellers offering the product, quantity of the product sold, duration of time that the product has been on a site, as well as search engine optimization factors, such as keywords in the title of a publication that includes a listing of the product.

In some example embodiments, the item level factors may be located within a local database (e.g., database(s) 126), or at a third party server 130. For example, the data collection module 202 may retrieve the item level factors as raw, unedited data from a dump (e.g., a database dump).

In operation 304, the modeling module 204 generates a machine learned (ML) model data object based on the input variables using Gradient Boosted Machine (GBM) modeling techniques, to calculate a probability of future traffic for the product. Gradient boosting is a machine learning technique for regression and classification problems, which produces a prediction model in the form of an ensemble of weak prediction models (e.g., decision trees). Gradient boosting combines weak learners into a single strong learner, in an interactive fashion. In some example embodiments, the modeling module 204 may additionally use the previous SEO performance of the product in calculating the probability.

In operations 306, the modeling module 204 trains the ML model based on the input variables gathered by the collection module 202. Supervised learning techniques may be applied to train the ML model using the input variables. In a supervised learning scenario, the model is provided with example inputs (e.g., the input variables) and their desired output (e.g., a target variable), with the goal being to map inputs to desired outputs. The collection module 202 may access and monitor a sample set of products (within the databases 126, or at a third party server 130) over a predetermined period of time (e.g., 3 months) to identify a search traffic value of the sample set of products. The sample set of products may comprise a portion of products with a zero search traffic value (no traffic at all), and a portion with a search traffic value greater than zero (any amount of traffic). Target variables may then be determined based on the search traffic values of the sample set of products, and be applied to the ML model.

The modeling module 204 provides the ML model with the input variables and the natural search traffic of the products as the target variable. Based on the input variables and the target variable, the modeling module 204 trains the ML model to maximize the probability of driving natural search to a linked site by identifying the item level factors (within the input variables) that correspond to an increase in traffic. For example, the modeling module 204 may identify a set of item level factors that correspond to a net increase in natural search traffic.

In operation 308, the indexing module 206 assigns the product (from among a set of products) an index status (e.g., "index," or "no-index") based on the ML model. For example, the indexing module 206 may index the product as "index," or "no index" based on the probability of natural search traffic calculated by the ML model. In some example embodiments, the indexing module 206 receives a threshold natural search traffic value, and indexes the products based on the corresponding natural search traffic values and item level factors of the products. For example, the threshold natural search traffic value may be based on the natural search traffic values of the sample set of products monitored by the collection module 202. In further example embodiments, the indexing module 206 may receive a value indicating a natural search traffic of the set of products, and apply the natural search traffic of the set of products as the threshold value.

In operation 310, the item page selection module 208 selects valuable item pages (VIP) based on the indexed products. The VIP may correspond to the products having the greatest probability of natural search traffic (based on the natural search traffic value probability calculated based on the ML model).

In operation 312, the item page selection module 208 assigns an "index" HTML tag to the VIPs. For example, the item page selection module may simple tag the VIP with an "index" HTML tag, wherein the "index" HTML tag causes the VIP to be displayed among a set of search results by a search engine. Pages not identified by the item page selection module 208 are tagged with a "no-index" HTML tag in order to prevent search engines from retrieving the pages for search requests.

Figure 4:
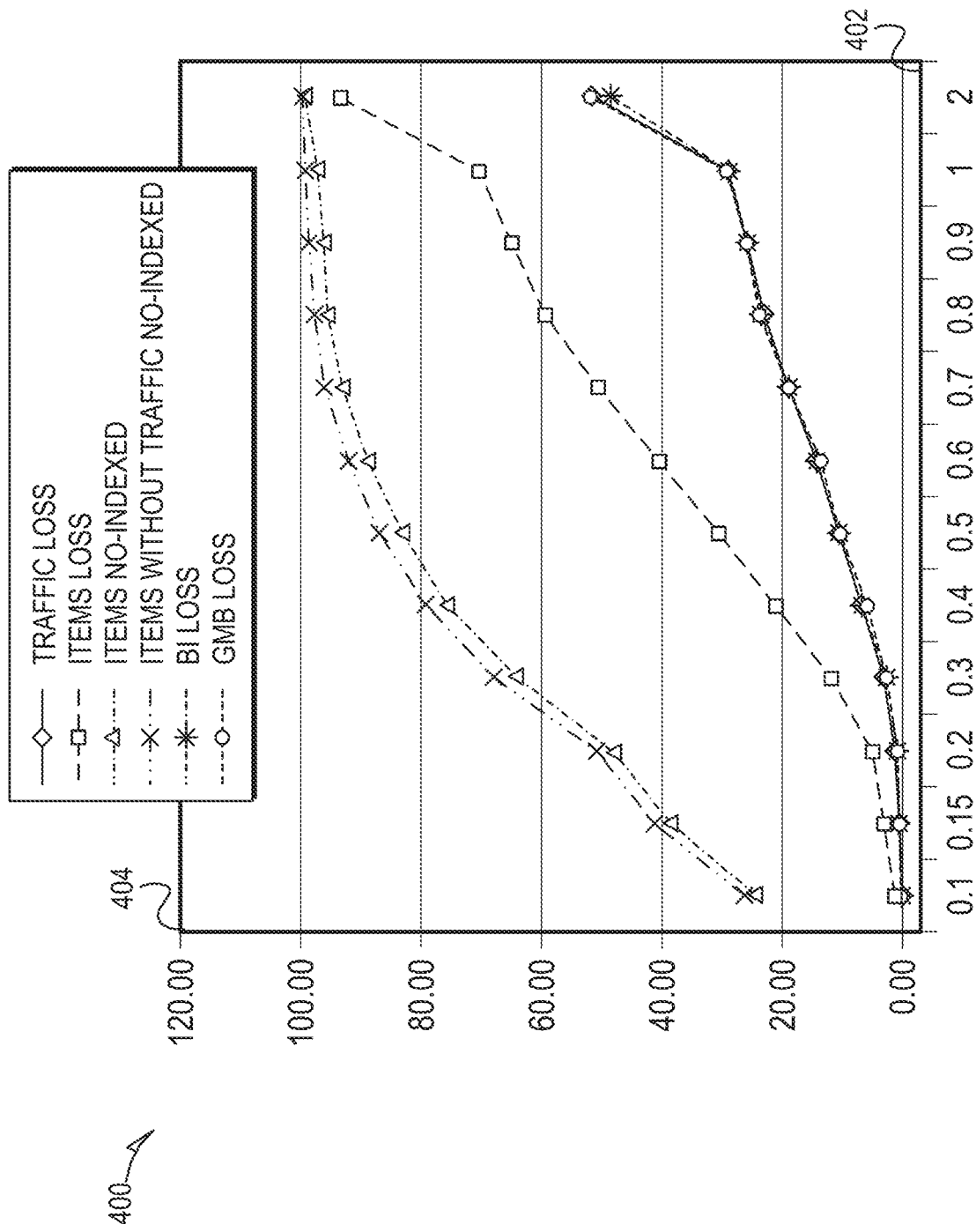
FIG. 4 is an illustration of how performance of a machine learned (ML) model varies with decision threshold.

FIG. 4 is a graph 400 illustrating how performance of a machine learned model varies with decision threshold (e.g., threshold value). As shown in FIG. 4, the x-axis 402 corresponds to the threshold value calculated by the modeling module 204, and the y-axis 404 corresponds to a percentage (e.g., of gain or loss). As indicated by the graph 400, as the threshold value increases, the percentage along the y-axis 404 increases.

In some embodiments, in order to validate the performance of the ML model, the system creates a validation data set. The validation data set is created by unbiased random sampling of products that are distinct (not a part of) the sample set of products. In order to measure the performance of the ML model, validation metrics are considered, including a decision threshold, and a correlation between a predicted and actual traffic.

For a given decision threshold, the following values may be retrieved from the validation dataset: a percentage of total VIPs reduction; a percentage of traffic loss due to the reduction; a percentage of false negatives; a percentage of bought item loss; and a percentage of GBM loss.

Figure 5:
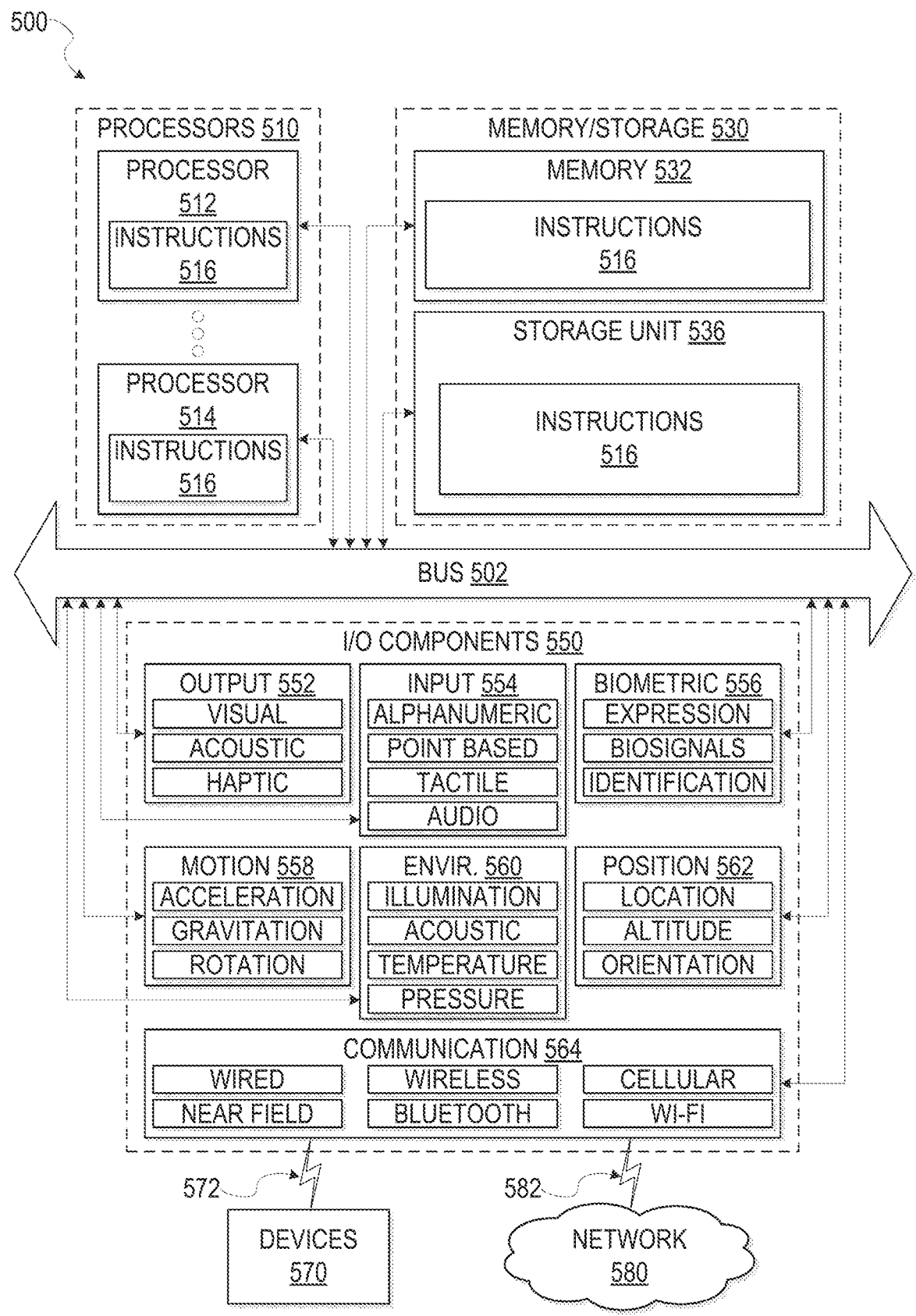
FIG. 5 is a diagrammatic representation of a machine in the example form of a computer system within which a set of instructions may be executed for causing the machine to perform any one or more of the methodologies discussed herein.

FIG. 5 is a diagram illustrating a process flow of a method 500 of identifying and indexing a valuable view item page, according to some example embodiments. The method 500 of FIG. 5 is described with reference to interactions between the selective indexing system 150 and the database 126. The database 126 may store a corpus of view item pages.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. Additionally, or alternatively, the instructions may implement the modules of FIG. 2. The instructions transform the general, non-programmed machine into a specially configured machine programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment.

The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by machine 500. Further, while only a single machine 500 is illustrated, the term "machine" shall also be taken to include a collection of machines 500 that individually or jointly execute the instructions 516 to perform any one or more of the methodologies discussed herein.

The machine 500 includes processors 510, memory 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 512 and processor 514 that may execute instructions 516. The term "processor" is intended to include multi-core processor that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core process), multiple processors with a single core, multiple processors with multiples cores, or any combination thereof.

The memory/storage 530 may include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 may also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of processors 510 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine 500 (e.g., processors 510), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes transitory signals per se.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562 among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via coupling 582 and coupling 572 respectively. For example, the communication components 564 may include a network interface component or other suitable device to interface with the network 580. In further examples, communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a Universal Serial Bus (USB)).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network and the coupling 582 may be a Code Division Multiple Access (CDMA) connection, a Global System for Mobile communications (GSM) connection, or other type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to devices 570. The term "transmission medium" shall be taken to include any intangible medium that is capable of storing, encoding, or carrying instructions 516 for execution by the machine 500, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a processor; and
a memory coupled to the processor and storing instructions that, when executed by the processor, cause the system to perform operations comprising:
calculating, for a product, a search traffic value based at least in part on a set of item level factors, the search traffic value indicating a probability that the product is returned in response to user search;
identifying, from a database, an item listing for the product;
assigning, based at least in part on the search traffic value, an index status to the item listing for the product indicating to return the item listing in response to user search;
receiving a search query corresponding to the product; and
returning the item listing for the product based at least in part on the search query and the index status assigned to the item listing.

2. The system of claim 1, wherein the instructions, when executed by the processor, further cause the system to perform operations comprising:
identifying the set of item level factors corresponding to the probability that the item listing is returned in response to user search.

3. The system of claim 1, wherein the instructions, when executed by the processor, further cause the system to perform operations comprising:
identifying, from the database, a second item listing for the product or a second product;
assigning a second index status to the second item listing for the product or the second product, indicating to refrain from returning the second item listing in response to user search;
receiving a second search query corresponding to the product or the second product; and
refraining from returning the second item listing for the product or the second product based at least in part on the second search query and the second index status assigned to the second item listing.

4. The system of claim 3, wherein the instructions to assign the second index status, when executed by the processor, further cause the system to perform operations comprising:
  determining to assign the second index status based at least in part on a second search traffic value for the second item listing failing to satisfy a threshold search traffic value.

5. The system of claim 1, wherein the instructions, when executed by the processor, further cause the system to perform operations comprising:
  assigning the index status to the item listing based at least in part on the search traffic value satisfying a threshold natural search traffic value.

6. The system of claim 1, wherein the instructions, when executed by the processor, further cause the system to perform operations comprising:
  identifying, from the database and the item listing for the product, a set of input variables associated with the product, wherein calculating the search traffic value is further based at least in part on one or more of the set of input variables associated with the product.

7. The system of claim 6, wherein the set of input variables comprise a historical natural search traffic of the product, a view count of the product, a price of the product, a number of listings of the product, a bounce count corresponding to the product, a number of unique sellers offering the product, a quantity of the product sold, a duration of time that the product has been online, or a combination thereof.

8. A computer implemented method comprising:
  calculating, for a product, a search traffic value based at least in part on a set of item level factors, the search traffic value indicating a probability that the product is returned in response to user search;
  identifying, from a database, an item listing for the product;
  assigning, based at least in part on the search traffic value, an index status to the item listing for the product indicating to return the item listing in response to user search;
  receiving a search query corresponding to the product; and
  returning the item listing for the product based at least in part on the search query and the index status assigned to the item listing.

9. The computer implemented method of claim 8, further comprising:
  identifying the set of item level factors corresponding to the probability that the item listing is returned in response to user search.

10. The computer implemented method of claim 8, further comprising:
  identifying, from the database, a second item listing for the product or a second product;
  assigning a second index status to the second item listing for the product or the second product, indicating to refrain from returning the second item listing in response to user search;
  receiving a second search query corresponding to the product or the second product; and
  refraining from returning the second item listing for the product or the second product based at least in part on the second search query and the second index status assigned to the second item listing.

11. The computer implemented method of claim 10, wherein assigning the second index status comprises:
  determining to assign the second index status based at least in part on a second search traffic value for the second item listing failing to satisfy a threshold search traffic value.

12. The computer implemented method of claim 8, further comprising;
  assigning the index status to the item listing based at least in part on the search traffic value satisfying a threshold natural search traffic value.

13. The computer implemented method of claim 8, further comprising:
  identifying, from the database and the item listing for the product, a set of input variables associated with the product, wherein calculating the search traffic value is further based at least in part on one or more of the set of input variables associated with the product.

14. The computer implemented method of claim 13, wherein the set of input variables comprise a historical natural search traffic of the product, a view count of the product, a price of the product, a number of listings of the product, a bounce count corresponding to the product, a number of unique sellers offering the product, a quantity of the product sold, a duration of time that the product has been online, or a combination thereof.

15. A non-transitory computer-readable medium storing instructions which, when executed by a processor, cause the processor to perform operations comprising:
  calculating, for a product, a search traffic value based at least in part on a set of item level factors, the search traffic value indicating a probability that the product is returned in response to user search;
  identifying, from a database, an item listing for the product;
  assigning, based at least in part on the search traffic value, an index status to the item listing for the product indicating to return the item listing in response to user search;
  receiving a search query corresponding to the product; and
  returning the item listing for the product based at least in part on the search query and the index status assigned to the item listing.

16. The non-transitory computer-readable medium of claim 15, wherein the instructions, when executed, further cause the processor to perform operations comprising:
  identifying the set of item level factors corresponding to the probability that the item listing is returned in response to user search.

17. The non-transitory computer-readable medium of claim 15, wherein the instructions, when executed, further cause the processor to perform operations comprising:
  identifying, from the database, a second item listing for the product or a second product;
  assigning a second index status to the second item listing for the product or the second product, indicating to refrain from returning the second item listing in response to user search;
  receiving a second search query corresponding to the product or the second product; and
  refraining from returning the second item listing for the product or the second product based at least in part on the second search query and the second index status assigned to the second item listing.

18. The non-transitory computer-readable medium of claim 17, wherein the instructions to assign the second index status, when executed, further cause the processor to perform operations comprising:

determining to assign the second index status based at least in part on a second search traffic value for the second item listing failing to satisfy a threshold search traffic value.

19. The non-transitory computer-readable medium of claim 15, wherein the instructions, when executed, further cause the processor to perform operations comprising:
assigning the index status to the item listing based at least in part on the search traffic value satisfying a threshold natural search traffic value.

20. The non-transitory computer-readable medium of claim 15, wherein the instructions, when executed, further cause the processor to perform operations comprising:
identifying, from the database and the item listing for the product, a set of input variables associated with the product, wherein calculating the search traffic value is further based at least in part on one or more of the set of input variables associated with the product.

\* \* \* \* \*